INVENTORS
MAC W. LUTZ
NEIL F. BROWN
BY HARLIE J. KIMMERLE

ATTORNEYS

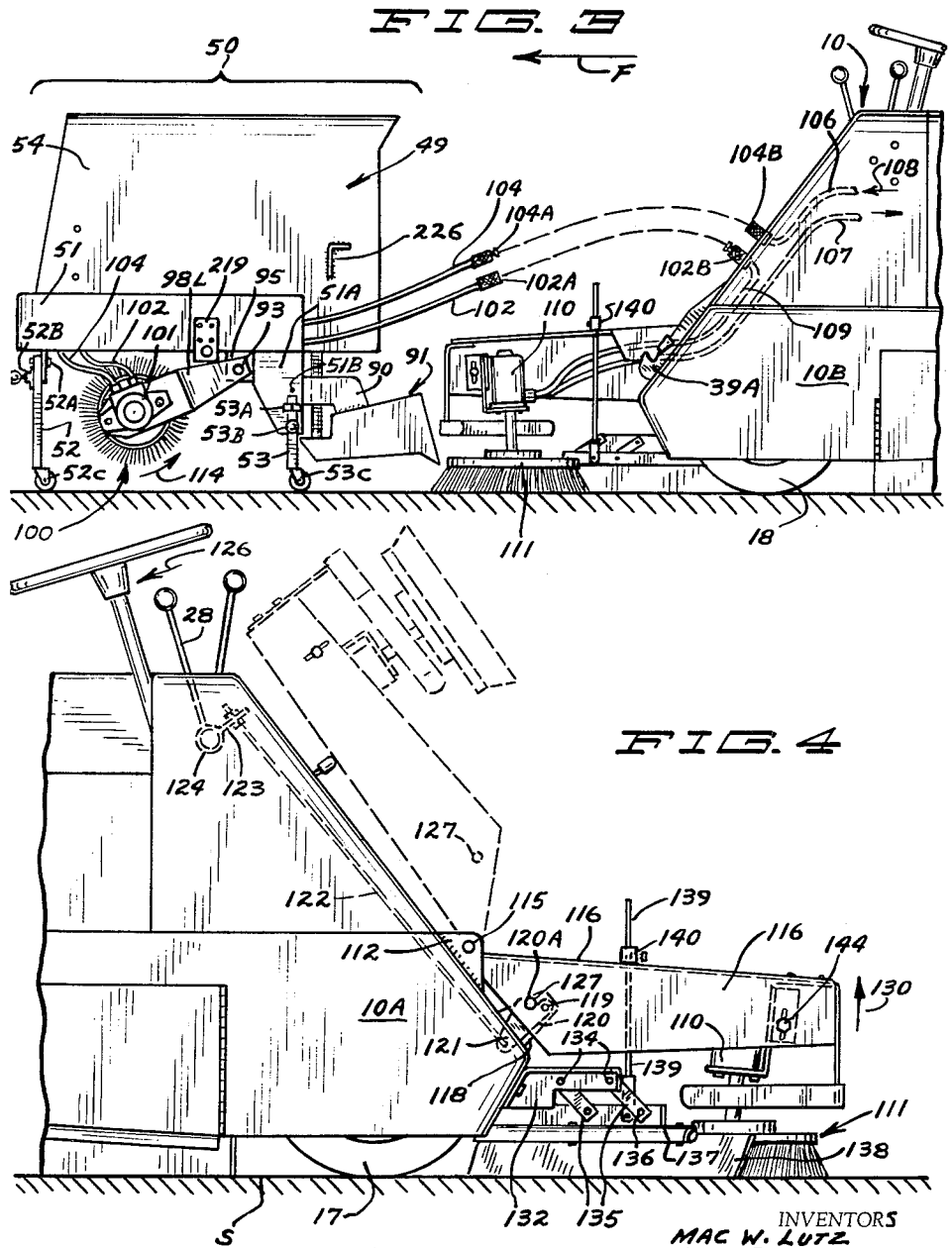

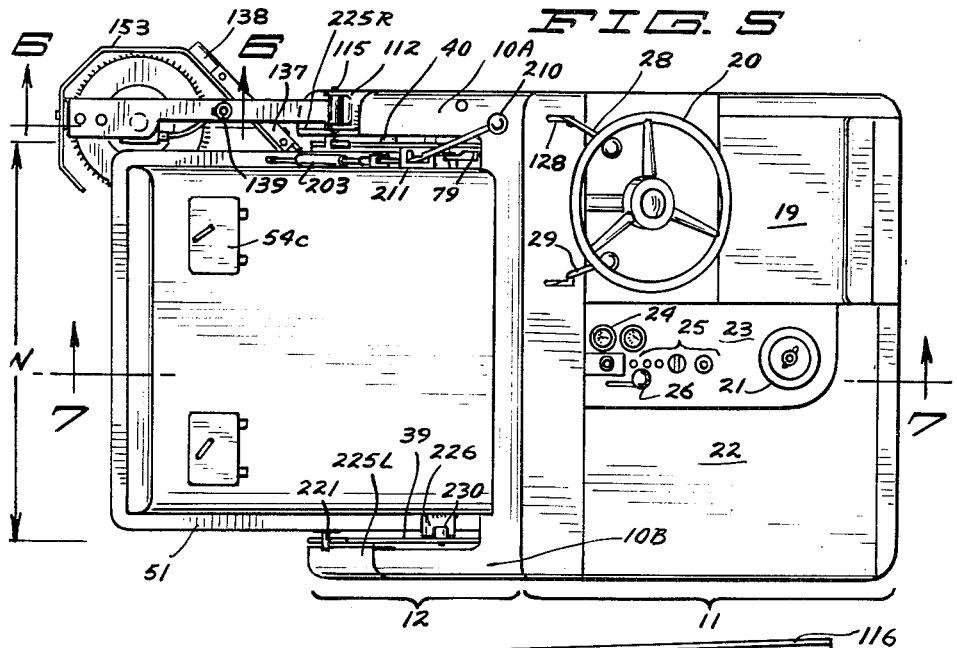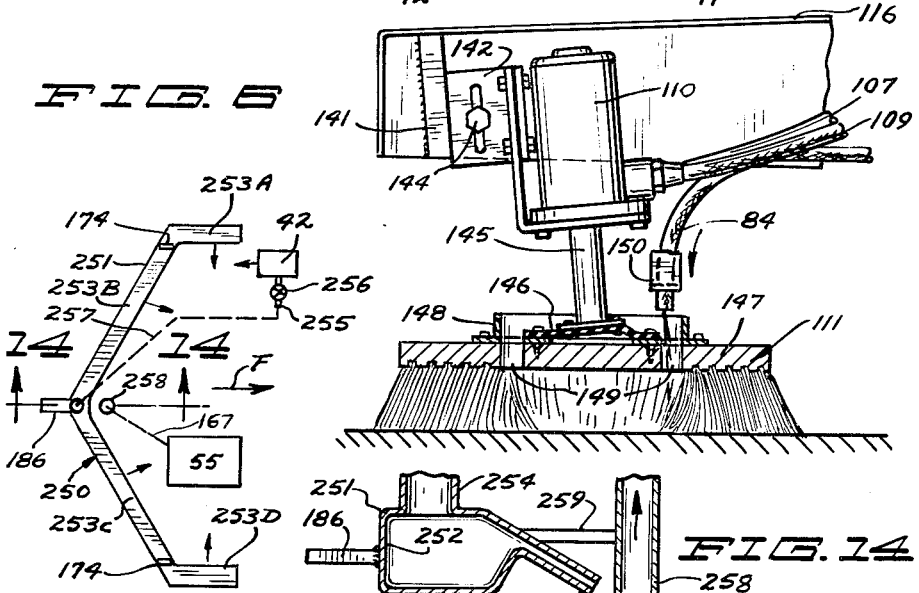

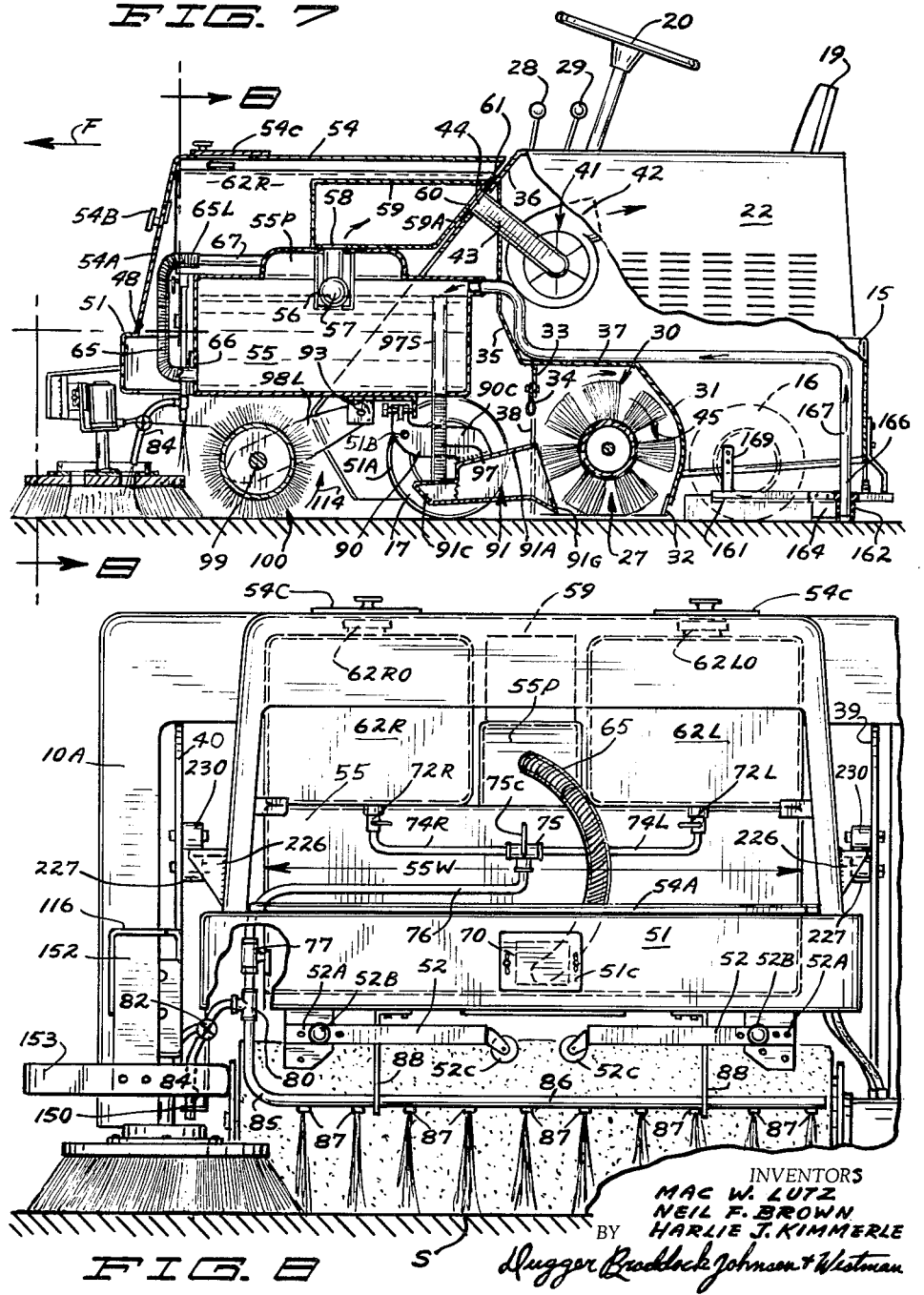

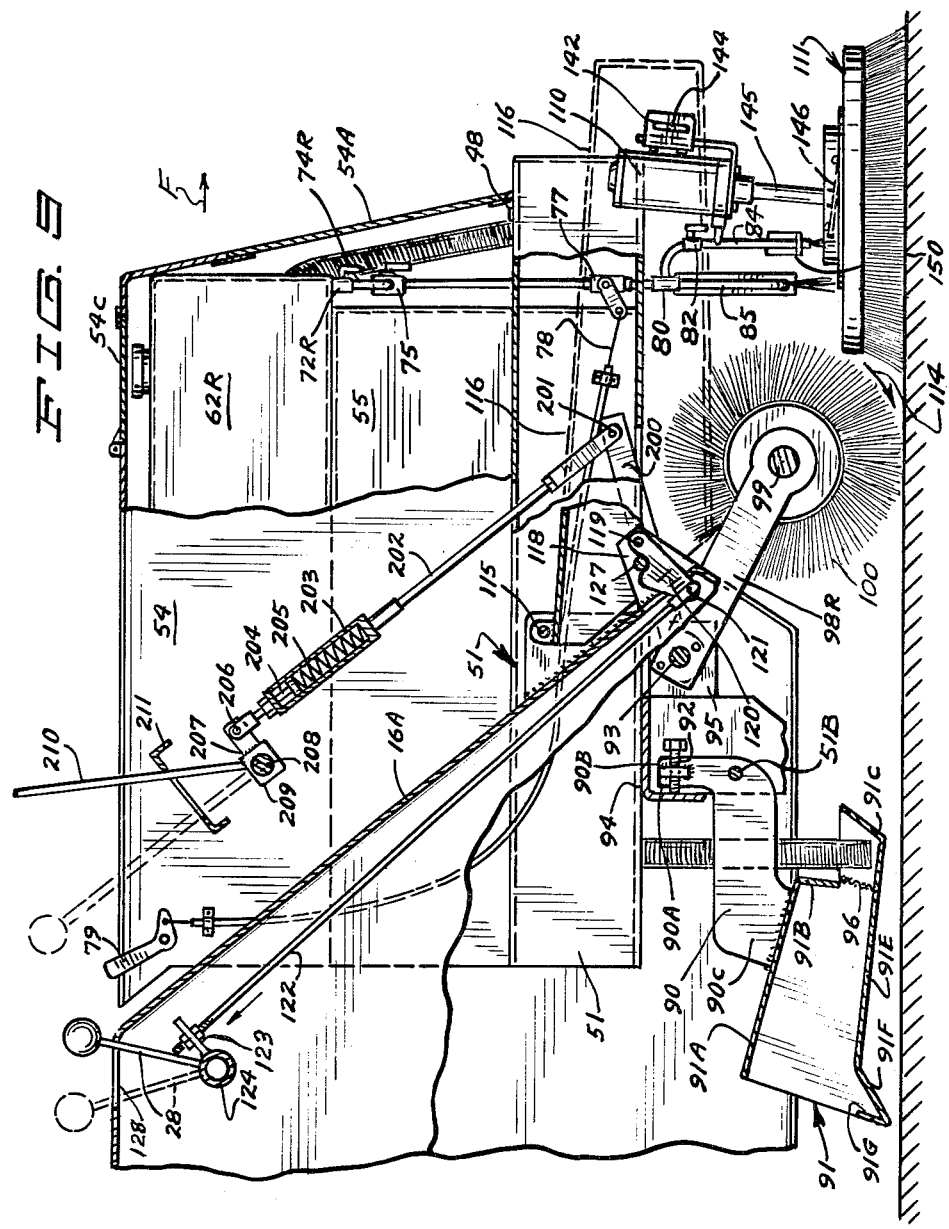

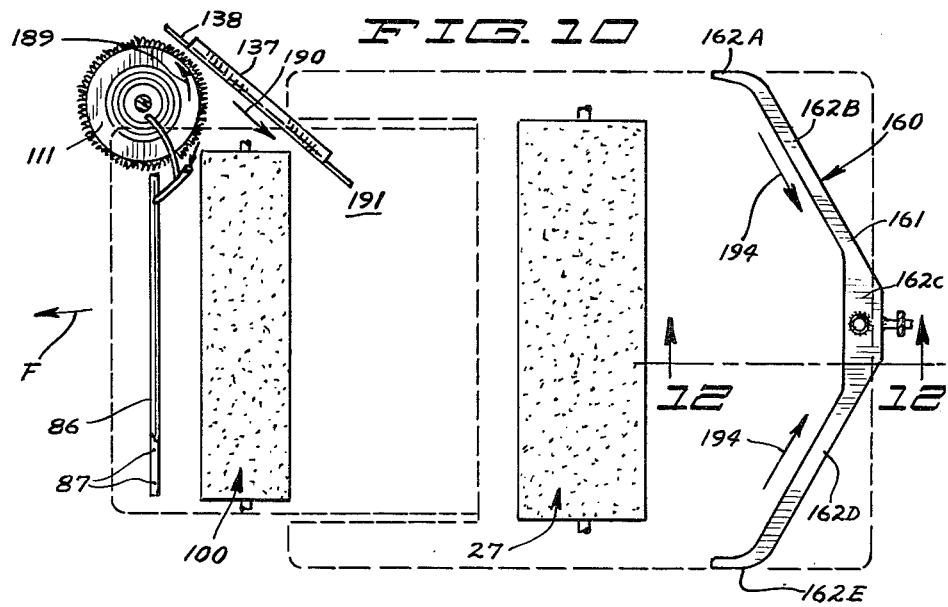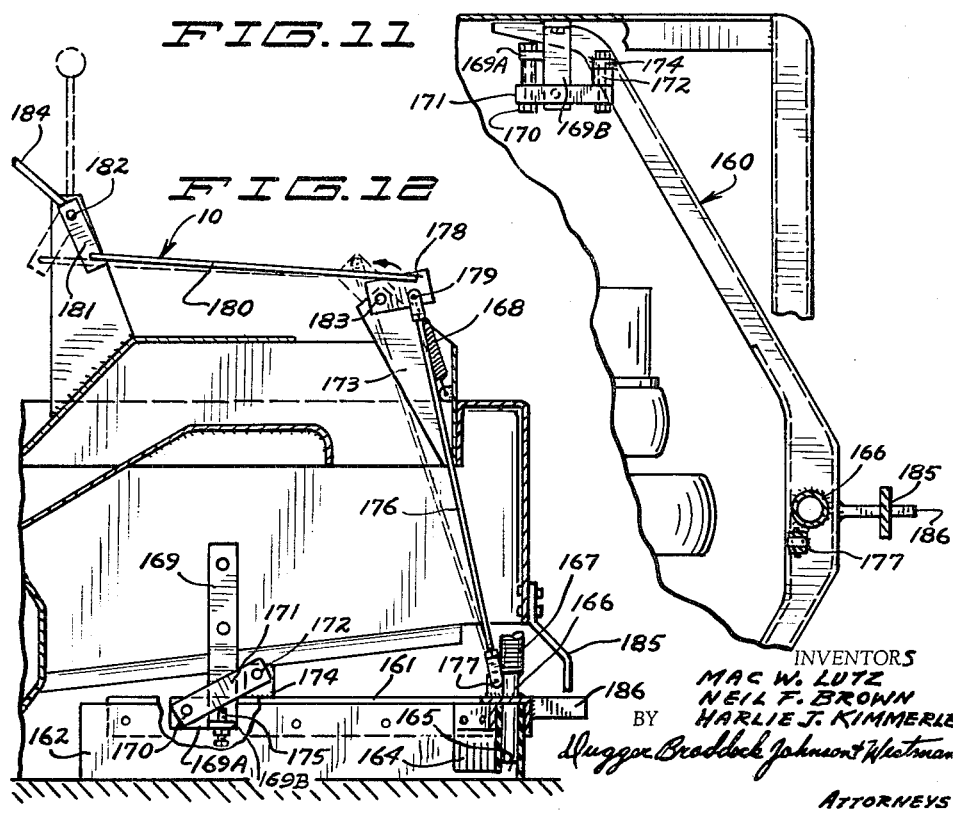

United States Patent Office 3,197,798
Patented Aug. 3, 1965

3,197,798
SCRUBBING MACHINE
Neil F. Brown, Mac W. Lutz, and Harlie J. Kimmerle, Minneapolis, Minn., assignors to G. H. Tennant Company, Minneapolis, Minn., a corporation of Minnesota
Filed Jan. 28, 1963, Ser. No. 254,180
28 Claims. (Cl. 15—320)

According to the application of Ralph C. Peabody, Serial No. 137,865, filed September 13, 1961 by Ralph C. Peabody and assigned to the same assignee as this application, there is provided a machine which includes a wheel supported, power driven, riding-type, operator controlled mobile vehicle. The vehicle per se has its engine, transmissions, and steering and driving wheels. These may be selected as desired for the speed and mobility desired. In addition, pursuant the invention of said application Serial No. 137,865, on the vehicle there is provided an open bottom enclosure on which a rotary tool, such as a cylindrical brush, sander, etc., is supported for working on a surface, such as a floor or roadway, over which the vehicle is moved. This mobile transport vehicle also includes a suction blower, operated by a power source (which may be the propulsion engine on the vehicle) the suction blower being provided for withdrawing air from the working enclosure in which the rotary tool is disposed.

Pursuant the invention of said application, Serial No. 137,865, the transport vehicle is also provided with support members or lift-levers, which are hydraulically operated from a hydraulic pressure source on the vehicle. The hydraulic source includes a pump or pumps driven from the power source (engine) on the vehicle. The support members (lift arms) are utilized for lifting and carrying any one of several types of separate working units which require mobility and power, and which, with the vehicle will provide a power sweeper, power sander or polisher, mobile fire fighting unit, etc.

A principal use of the device covered by said application, Serial No. 137,865 is as a power sweeper, and for such use the rotary tool is a cylindrical sweeping brush, and a vertical axis curb brush may then also be provided. The brushes are driven from the power source on the vehicle. In order to collect the swept debris, and to confine the dust raised by the sweeping operation, there is provided a separate filter and refuse unit which is, according to this application, supported by support members on the mobile vehicle. This separate refuse unit includes a swept debris receiving pan, and a self-contained dust filter of large capacity. When this separate unit is carried on the support members of the mobile vehicle, it has an open mouth that opens into the working chamber in which the rotary brush operates, the swept debris and dust raised by the sweeping operation being thrown and drawn respectively through the chamber opening into the separate unit where the heavier materials settle and the dust laden air is drawn upwardly through the filter. Suction for the filter action is provided by the suction fan on the mobile vehicle, a suitable association between the filter and the suction port on the mobile vehicle being provided so that suction is applied through the refuse unit filter when the dirt collecting and air filtering refuse unit is in place.

For other uses, the dirt collecting and air filtering unit may be elevated and placed upon a temporary stand and totally removed from the mobile vehicle, and then the vehicle can be utilized for other purposes such as the carrying of a fire-fighting unit as disclosed in the aforesaid application Serial No. 137,865.

According to the application of Mac W. Lutz, Serial No. 137,863, now Patent No. 3,165,775, filed September 13, 1961 and assigned to the same assignee as this application, the mobile vehicle is driven by a hydraulic propulsion system which provides forward and reverse propulsion and a complete speed variation in either direction. The sweeping brush on the mobile vehicle can, most conveniently, be driven from the engine by means of a mechanical drive. The curb brush, where used, can most conveniently be driven by a small hydraulic motor from hydraulic sources on the mobile vehicle.

Therefore, according to the applications aforesaid, there are provided a powered mobile vehicle which can be steered by the operator who rides the vehicle, and there is available on such mobile vehicle a working enclosure in which a rotary surface working tool such as a cylindrical brush or the like is disposed and may be operated. Also available on the vehicle are adequate hydraulic pressure supplies for operating adjunct devices, and for operating the support arms of the vehicle for raising and lowering heavy units which may be utilized therewith, as for example, the debris-receiving unit.

According to the present invention there is provided a scrubbing machine, which is in the form of a scrubbing unit adapted to be supported by the support members of the mobile transport vehicle specified in the aforesaid copending applications. The scrubbing unit, while being an entirely separate entity and completely removable from the mobile vehicle, is made so as to operate in conjunction with it such that in the scrubbing operation, parts and devices on the mobile vehicle are also utilized.

It is an object of the present invention to provide a new and novel scrubbing machine for scrubbing horizontal surfaces such as floors, areaways, roadways, sidewalks, streets, and the like. It is a further object of the invention to provide a scrubbing machine that includes a new and novel separate, self-contained, scrubbing unit having a scrubbing liquid supply and storage for the scrubbing liquid that is picked up.

It is another object of the invention to provide a new and novel scrubbing unit which has several scrubbing components including a scrubbing liquid supply and storage for picked-up scrubbing liquid, as a separate entity that can be detachably carried by a separate mobile vehicle having a sweeping enclosure therein. It is still another object of the invention to provide an improved scrubbing machine having multiple scrubbing brushes.

It is a further object of the invention to provide a scrubbing machine having a curb-scrubbing brush and cylindrical scrubbing brush with scrubbing liquid collection and pick-up means therefor. It is another object of the invention to provide a scrubbing machine wherein the liquid is applied to the surface over which the machine is propelled and scrubbed first in one direction and then in another direction by multiple cylindrical brushes; and then the liquid is collected and picked up and stored on the machine. It is a further object of the invention to provide a scrubbing machine wherein liquid is applied to the surface over which the machine operates, next the surface is scrubbed by means of a power-driven scrubbing brush, thence the liquid is swept into a collection pan along with any solid debris on the surface being scrubbed, next the liquids and solids separated, the separated liquid being collected and stored on the machine for later emptying, and finally the surface is squeegeed for collecting any residual liquid on said surface, such residual liquid being picked up and stored for later emptying.

It is a further object of the invention to provide a sweeping and scrubbing machine having separate removable units that may be interchanged including a collecting unit for dry, swept debris and alternately a scrubbing unit for wetting the surface and scrubbing the surface over which the machine operates. Another object of the invention is to provide a new and novel scrub water pick up assembly.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 3 is a left side elevational view showing the scrubbing unit removed from the mobile vehicle and a portion of a left front side of the mobile vehicle;

FIGURE 4 is a right side elevational view showing the front portion of the propulsion vehicle with the scrubbing unit removed, said view in solid lines illustrating the curb scrubbing brush in working position, and in dotted lines in a raised-out of the way position (when the curb brush is not to be used);

FIGURE 5 is a plan view of the scrubbing machine illustrated in FIGURE 1, FIGURE 5 being taken along the line and in the direction of arrows 5—5 of FIGURE 1;

FIGURE 6 is a fragmentary vertical sectional view of the curb scrubbing brush taken along the line and in the direction of arrows 6—6 of FIGURE 5;

Figure 1:
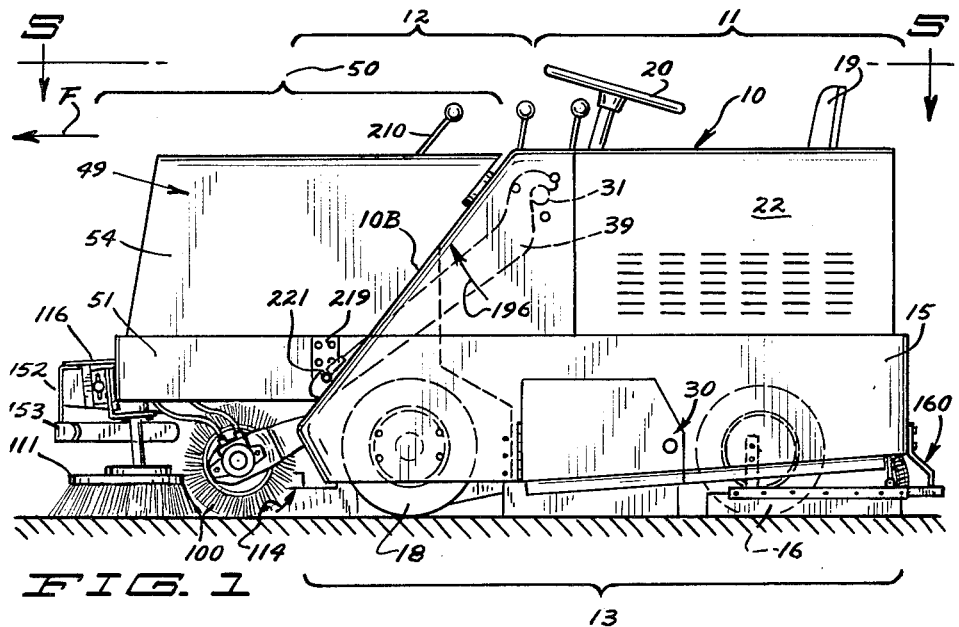
FIGURE 1 is a left side elevational view of the scrubbing machine of the present invention showing the mobile propulsion vehicle and the removable scrubbing unit mounted thereon.

FIGURE 7 is a longitudinal vertical view with some of the parts broken away and in section. The sectioned portions of the machine as shown in FIGURE 7 (except for the sectioned portions of the curb brush) are generally taken along the line and in the direction of arrows 7—7 of FIGURE 5. In respect to the curb brush, the sectioned portions are taken along the line and in the direction of arrows 6—6 of FIGURE 5;

FIGURE 8 is a front view of the machine of FIGURE 1, with the front cover access door open and accordingly corresponding to a transverse vertical sectional view taken along the line and in the direction of arrows 8—8 of FIGURE 7;

FIGURE 9 is an enlarged fragmentary right elevational view partly broken away and sectioned at various section lines through the scrubbing unit to show various controls for the scrubbing brushes and scrubbing liquid. This view also illustrates portions of the curb brush arm in phantom and the swept material collection chamber in a partially raised position as if it were riding over an object on the floor;

FIGURE 10 is a diagrammatic plan view illustrating the positions of the scrubbing liquid delivery, the scrubbing brushes and the squeegee assemblies;

FIGURE 11 is a fragmentary plan view illustrating a portion of the first embodiment of the rear squeegee assembly, parts of the machine being broken away;

FIGURE 12 is a fragmentary sectional view taken along the line and in the direction of arrows 12—12 of FIGURE 10 to illustrate the lifting control mechanism of the rear squeegee assembly of FIGURE 11;

FIGURE 13 is a fragmentary horizontal view of a modified embodiment of an assembly that may be used in place of the assembly of FIGURE 11, portions of said view being diagrammatically illustrated; and FIGURE 14 is a sectioned view taken along the line and in the direction of the arrows 14—14 of FIGURE 13.

Throughout the drawings, corresponding numerals refer to the same parts.

Referring to the drawings, the mobile propulsion vehicle, generally designated 10, as viewed from either side, has an overall length from fore to aft as shown over the bracket 13. However, the shape of the vehicle is such that the main body of the vehicle is under the bracket 11 (see FIGURES 1 and 5). From the front corners of this main body of the machine there projects the generally forwardly and downwardly inclined portions 10A and 10B, the longitudinal length of the projections being under the bracket 12 in FIGURE 1. These projections are spaced apart so as to provide a clear space having a width W (FIGURE 5) between them.

The front wheels 17 and 18 of the machine are carried by the frame projections 10A and 10B, and may either be idler wheels or power driven, if desired. The wheels 17 and 18 are not steering wheels. The wheel 16 at the rear of the vehicle is power driven and is steerable, steering being provided by suitable connections (not illustrated) with the steering wheel 20.

The steering wheel is conveniently located adjacent the operator's seat 19. At the left side of the operator's seat there is provided the engine compartment 22, the engine therein being suitably drivingly connected to the driving wheel(s). Between the engine compartment and the operator's seat there is provided a panel 23 on which are located engine instruments 24 and various controls 25 and 26 (see FIGURE 5). Additional controls are provided at 28 for lifting and lowering the curb brush generally designated 111, and at 29 for lifting and lowering the main sweeping brush 27, both of which are carried on the mobile propulsion vehicle.

Within the space between the front wheels 17–18 and the rear wheel 16 there is provided a working enclosure, generally designated 30, which is defined by a curved rear wall 31 having a flexible skirt 32 on the bottom edge thereof, a top wall 37 which is also part of the frame, and a forward wall 33 which extends downwardly a short distance and is provided with a soft rubber edging at 34 (see FIGURE 7). This edging normally seals this working space 30 to the entrance nose of a rearwardly directed opening into a separate detachable unit into which swept debris is projected and through which air, collected in the sweeping enclosure, is withdrawn, all as described in co-pending application, Serial No. 137,865. A wall 35 extends forwardly from the junction of walls 37 and 33 and thence upwardly to the upper forward and downward slanting wall 36 of the propulsion vehicle main frame. Aligned with the wall 33 of the propulsion vehicle are flexible side flaps 38, which seal to the swept debris receiving opening of the separate sweeping refuse unit when the machine is used as a sweeper. In the present situation, the seals 34 and 38 merely or an opening, through which portions of the scrubbing machine receiving hopper 91 project, as will be described.

Within the space 30 there is rotatably mounted the sweeping brush, generally designated 27. The suspension of this brush and drive therefor are described in said co-pending applications. It is sufficient for the purposes of this application to say that the brush 27 is mounted so that it can be moved up and down for varying its working height and to compensate for bristle wear. The height of the brush is adjusted by means of the lever 29 which is conveniently located adjacent the driver's seat, the height of the brush being limited by an adjustable stop (not shown) adjacent to lever 29. The brush 27 is power rotated by means of a suitable mechanical or hydraulic drive (not illustrated) from the engine (not illustrated) in the engine compartment 22.

Also located within the engine compartment is a suction blower, generally designated 41, having an outlet 42 and a suction inlet hose 43 which leads to a suction port 44 in a frame piece 36 of the propulsion vehicle. When the propulsion vehicle is used as a sweeping machine, the debris collection and filtering unit, which is a separate entity, is carried in the space between forwardly projecting portions 10A and 10B of the vehicle, and a suction outlet on such entity coincides with suction port 44 so that vacuum is communicated from the suction blower to the filter in said separate unit, but there is no mechanical connection between them. They are merely associated in fluid communication.

Hence, the suction port 44 as such is merely a hole in the panel 36 which is fluidly connected by the suction hose to the inlet of the suction blower 41. Hence, there is a negative pressure or suction available at the port 44, to be used as desired.

Figure 2:
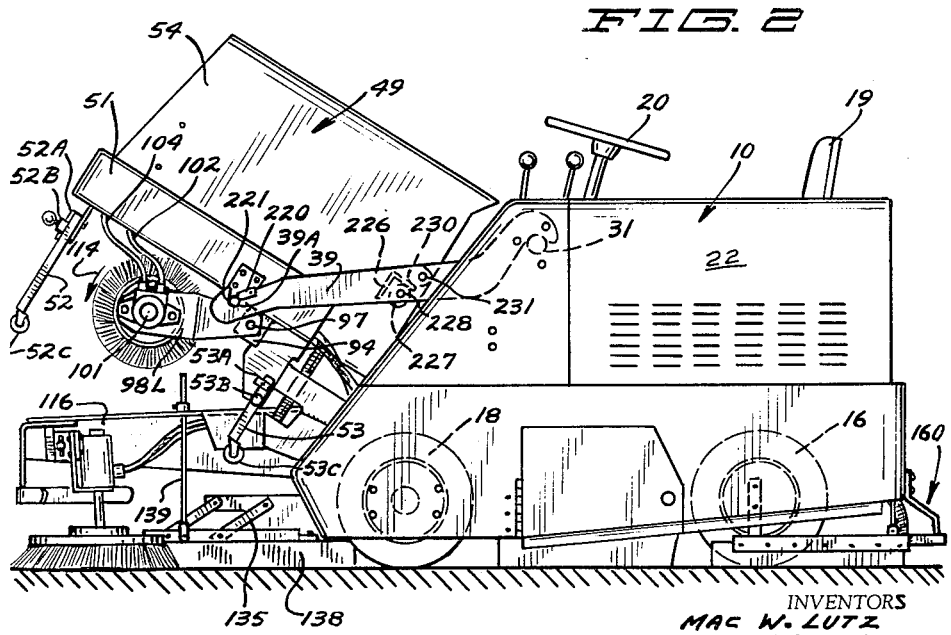
FIGURE 2 is a left side elevational view of the scrubbing machine of the present invention showing the mobile vehicle, and showing the principal scrubbing unit in elevated condition preparatory to removal thereof from the mobile vehicle.

Referring to FIGURES 1–5, the scrubbing unit generally designated 49 is shown under the bracket 50 and is removably attached to and carried by the mobile propulsion vehicle 10. In FIGURE 2 the scrubbing unit is elevated by the support arms 39 and 40 of the propulsion vehicle, preparatory to being disconnected and set on its own legs 52, 53. FIGURE 3 shows the scrubbing unit entirely disconnected from the propulsion vehicle.

Referring now to FIGURES 1, 2, 3, 5 and 8, the structure for detachably mounting the scrubbing unit 49 on the propulsion vehicle 10 will be described. This structure includes the aforementioned support arms 39 and 40 that at their one ends are connected to a strong transverse shaft 31 which is journaled in the side plates of the support vehicle frame. The arms 39, 40, the shaft 31 and the structure for selectively rotating said shaft to move the arms between the position of FIGURE 1 and a position such as FIGURE 2 is substantially the same as that described in co-pending application, Serial No. 137,865, and therefore, will only be briefly referred to in part hereinafter.

On each central transverse side portion of frame belt 51 there is provided a depending plate 219 that mounts an outwardly extending stud pivot 221. The pivots 221 are located such that when the hydraulic cylinder for rotating shaft 31 and thereby arms 39, 40 is in its lowermost position (and also said arms), the pivots extend across the notched portions at the forward ends of the respective arm (39A for arm 39) to partially support the weight of unit 49 on said pivots. At this time the outer ends of pivots abut against flange plates 225L, 225R on projections 10B, 10A respectively to bear the remaining weight of the unit when it is in a lowered position such as illustrated in FIGURE 1.

On the central rear portion of each sidewall of cover 54 there is provided a right angle bracket 226 to abut against an eccentric 227 pivotally mounted on a clamp bolt 228 threaded into the central portion of the adjacent arm. The eccentrics 227 are set as described in application, Serial No. 137,865 for a sweeping unit and are not reset for the scrubbing unit. The horizontal legs of brackets 226 rest on the eccentrics 227, the vertical legs serving to position and prevent any undesired rearward movement of the unit relative to the vehicle, particularly when the unit is being attached to the vehicle.

When the unit 49 is attached and empty of liquid, the center of gravity will be slightly rearwardly of 221. However, when the tanks in the unit are at least partially filled and the vehicle 10 brought to a sudden stop, the unit might on occasion pivot in a counterclockwise direction (FIGURE 1) about said pivots and bounce over the eccentrics 227 and out of the notches in arms 39, 40. To prevent this, heavy clips 220 are mounted on the arms adjacent the respective arm notch to be between a position permitting free entry of the stud pivots to the notched portions and a position clampingly holding the stud pivots in the notched portions for only pivotal movement as shown in FIGURE 2. Thus, the clips may be set to prevent the pivots jumping out of the notched arm portions. To prevent the right angle brackets being pivoted or vertically moved any substantial amount relative to eccentrics 227, there is provided on each arm a second eccentric 230 and a clamp bolt 231 threaded into the arm to permit adjustably positioning eccentric 230 to abut against the upper surface of the horizontal leg of the respective bracket and hold it in an adjusted position while the corresponding lower surface abuts against the eccentric 227 which is left in the adjusted position for the sweeper unit. The four eccentrics, clips 220 and notched portions of the arms hold the unit 49 against movement relative to the arms during use and when the unit is moved to a position such as in FIGURE 2. However, by moving the clips out of engagement with the stud pivots and loosening clamp bolts 231 to permit movement of eccentrics 230 to increase the spacing relative eccentrics 227, the unit 49 may be easily separated from the support arms. Also, the eccentrics in said increased spaced relation does not interfere with the mounting of the sweeper unit on said arms.

The scrubbing unit comprises a frame 51 having a plurality of legs 52–53, each of which is pivoted as at 52A or 53A so that the legs can be swung down as shown in FIGURES 2 and 3, or swung up out of the way, where they are not even visible, as in FIGURE 1. Each of the legs is provided with a latch as at 52B and 53B so that the legs can be latched in either the down position as shown in FIGURES 2 and 3, or in an elevated position of FIGURE 1 and as shown in FIGURE 8 for legs 52. In FIGURE 1, the legs are folded up and are not visible, but it will be understood that they are under the unit 49, and do not interfere with said unit or vehicle operation. Preferably the legs are provided with caster rollers as at 52C and 53C so that when the scrubbing unit is entirely removed from the propulsion and support vehicle (which is the condition in FIGURE 3), the scrubbing unit can be moved for parking it.

The scrubbing unit is provided with a stout cover 54 made of material and thick enough so that it will serve as a framework for supporting various parts of the unit. A wrap-around frame belt at 51 is attached to the cover and has downwardly extending frame members 51A at its rear ends, to which the legs 53 are attached. The cover 54 has a front opening door 54A secured by a rotatable latch 54B and a plurality of top opening doors 54C (see FIGURE 8).

Within the thus formed scrubber unit housing there is provided a lower tank 55 which serves to receive the scrubbing liquid after it is picked up off of the floor. This tank extends substantially the full width of the unit as shown by the dimension 55W in FIGURE 8. The upper central portion of the tank 55 is an upwardly extending plenum 55P from which, on the inside of the tank, there is a downwardly extending cage 56 in which a foam plastic valve-ball 57 is held. The cage 56 coincides with an aperture 58 in the top of the plenum 55P, the aperture being of slightly smaller size than the diameter of the ball 57. When the ball floats upwardly on the liquid or foam collected within the tank 55 and plenum 55P, this closes the aperture 58 and thereby prevents the application of suction through aperture 58 to prevent foam and moisture droplets being carried over to the suction blower 41. On top of the plenum there is a connection chamber 59 which extends rearwardly in the unit 49. The rear surface of chamber 59 is slanted at 59A, and in this surface there is provided a port 60 which is so located that when the entire scrubbing unit 4 is positioned on the propulsion vehicle, the port 60 will register on the port 44 on the propulsion vehicle. A gasket at 61 is provided around the port 44 on the front wall 36 of the propulsion vehicle, and hence when the port 60 is in registry, the vacuum available at the port 44 will be communicated to the port 60, and thence through the port 58 to the collection tank 55 to accordingly induce a negative pressure therein. It will be noted, however, that there is actually no mechanical connection between the suction blower of the propulsion vehicle, and the vacuum system and port 60 of the scrubbing machine.

On both sides of the plenum chamber 55P, there are positioned scrubbing solution tanks, these being best illustrated in FIGURES 7 and 8. These tanks are identical, tank 62L being on the left side of the vehicle. These tanks extend from fore to aft within the scrubbing entity cover 54, and are suitably supported by interior framing. Each of the tanks may be provided with a removable cover for its inlet opening, at at 62RO and 62LO. Each of these openings are each located beneath one of the doors 54C on the frame cover 54. When the doors are opened, the tank covers 62RO and 62LO are thereby exposed for filling scrubbing liquid into the tanks.

The tank 55 has a drain rose 65 which is connected to the nipple 66 at a lower location on the tank 55. This drain hose is flexible, and has a loose end 56L that is temporarily "parked" on a closed end nipple 67, which, for convenience, is fastened onto the front face of the plenum chamber 55P. The nipple 67 is closed, and hence when in the position shown in FIGURE 7, no suction is provided on the drain tube 65. This is merely the parking position. When it is desired to drain the tank 55, the end 65L is loosened from the closed-end nipple 67 and 65L is then lowered suitable to discharge the contents of tank 55. There will be some solids and sludge, mud, etc. collected in tank 55, and in order to remove this, there may be, if desired, provided a removable door 70 having the nipple 66 to which the hose 65 is connected. When this door is removed, scrapers, etc. can be removed through the opening covered by the door, and the tank 55 flushed out. In order to obtain easy access to door 70, the front of frame belt 51 is likewise provided with a removable door at 51C.

The entire front of the housing 54 may be exposed when the door 54A is swung down about its pivot axis 48 or else just an opening may be provided at this location. When thus opened as shown in FIGURE 8, access can be had to the drain hose 65. Access can also then be had to the piping and controls by means of which the scrubbing liquid is handled. Referring to FIGURES 8 and 9, each of the tanks 62R and 62L is provided with an outlet at 72R and 72L respectively. These outlets are in the form of shut-off valves. From each outlet a pipe extends at 74R and 74L respectively to a common valve 75 which has a three position control 75C by means of which the liquid may be withdrawn from one of the other of tanks 62R or 62L, or both. When the control is set for withdrawal of liquid of both tanks, the valves 72R and 72L can be changed to intermediate positions for varying the relative quantity of liquids withdrawn from each tank, as where proportioning is desired. From the valve 75, the outlet continues at line 76 and extends through a flow control valve 77, which is actuated by a Bowden wire control 78 extending to a control lever 79 mounted on the exterior rear right side of the scrubbing entity in a position to be reached by the operator, by operating the lever 79 can turn the scrubbing liquid on or off. From the flow control valve 77 the line continues to a T connection 80 where a branch line 81 extends through valve 82 to the outlet 84, where scrubbing liquid can be delivered to the curb-scrubbing brush. From the T 80, a line also extends at 85 to the transverse, horizontal header 86 which is located just rearwardly of the front portion of belt 51, the header 86 being supported by the brackets 88. This header 86 is provided with a plurality of nozzles 87 which permit metered discharge of scrubbing liquid onto the surface S which is to be scrubbed.

Referring to FIGURES 1, 2, 3, 7 and 9, the downwardly extending brackets 51A at the rear terminations of the wraparound frame piece 51 serve not only to support the legs 53, but also mount pivot 51B. The pivot 51B is a rock-shaft on which a plurality of bent arms 90 are attached. The arms are for the purpose of supporting the swept material collection chamber generally designated 91, which will be described. There are a plurality of arms 90 across the width W of the vehicle, as many as are needed for providing requisite support for the chamber 91. Each of the arms 90 has an upwardly extending end portion to which a transverse lug 90B is welded. An adjusting stud 92 is threaded into the lug to bear against the frame piece 94 and thereby serve as an adjustment to maintain flange 91G a set distance above the floor. However chamber 91 is free to pivot a limited amount in a FIGURE 9 clockwise direction about the pivot axis 91B so that the chamber can ride up over an obstruction as unit 49 is moved in a forward direction. The opposite ends 90C of the arms 90 are bolted onto the top surface of the swept material collection chamber 91. As a result of providing for the above mentioned limited swinging movement of arms 90 and accordingly chamber 91, the chamber 91 can ride up over an obstruction and pivot a limited amount in a clockwise direction about pivot 51B as seen in FIGURE 7 while being raised, independent or without any corresponding vertical movement being to the frame of unit 49. The chamber 91 is sturdily made and has a top 91A which extends forwardly and downwardly where it connects to a solid vertical wall 91B. From the lower termination of this wall there is provided an open top, forwardly extending trough 91C, the forward portion of bottom piece 91E forming the bottom wall of said trough. The bottom piece 91E extends rearwardly and rises slightly in the rearwardly direction to the point 91F, after which the bottom slants sharply off in a rearwardly direction to terminate at a flange 91G. Immediately below the wall 91B there is a screen 96. The portion of the swept material collection chamber 91 which is to the right of the screen 96 as shown in FIGURE 9, is a liquid collection chamber or trough 91C, and into this chamber there extends a pipe 97. This pipe 97 dips down into the chamber as shown and includes a flexible hose portion extending upwardly intermediate arms 90 and thence connects to a stand pipe portion 97S reaching up into an elevated portion of the tank 55, which is above the bottom of cage 56.

The brush 27 rotates in the direction of the arrow 45 (FIGURE 7) and the scrubbing liquid will be swept forward by this brush over the flange 91G and into the swept material collection chamber 91. The force of the sweeping and the slight downward slope of the chamber in a forward direction will cause the liquid to run forwardly through the screen 96 where it collects and is sucked up at the lower open end of the pipe 97. A goodly flow of air will enter with the water, and the air and water are pulled up into the tank 55. This blast of air and water is thrown against the top of the tank where the water droplets are spearated and collect as liquid in the tank 55. When hard objects and solid material is swept by the brush 27, this will be thrown into the swept material collection chamber 91 and will collect ahead (left side in FIGURE 9) of the screen 96 and is periodically removed. It will be noted parenthetically that the scrubbing operation, for example a floor, should be carried out after a thorough sweeping. This machine is not intended primarily as a sweeping machine, but any incidental solid debris which may be left after the sweeping operation will pass under chamber 91 and be picked up by the machine and collected in the hopper 91.

The scrubbing unit has a pair of depending frame pieces 95 that mount pivot shaft 93, the forwardly extending arms 98L and 98R being attached to said shaft for swinging movement therewith. These arms serve as supports for the journals 99 for the forward cylindrical scrubbing brush 100.

A radical bar 200 is at one end welded to pivot shaft 93 and at the opposite end is pivotally connected at 201 to the bifurcated end portion of operating rod 202 (see FIGURE 9). The other end of rod 202 mounts one end of cylinder 203, there being provided a plunger 204 extended through the opposite aperture end wall of said cylinder to have the enlarged head portion of the plunger adapted to abut against the interior surface of said end wall. A coil spring 205 is seated in said cylinder to constantly urge said head portion to such an abutting position.

The bifurcated end portion of the plunger is pivotally connected at 206 to the control arm 207 which in turn is welded to a rock shaft 208. Shaft 208 is mounted by bracket 209 on the upper left side wall of cover 54 and has a control lever 210 connected thereto for rotating said shaft. Lever 210 extends upwardly through the U-notch in bracket 211 on the cover to be forwardly of the steering wheel. When the control lever is moved to the solid line position of FIGURE 9 (resiliently retained in the appropriate leg of the notch) the brush is resiliently urged against surface S to apply a downward pressure against said brush. That is, first the plunger head and cylinder move diagonally forwardly to through the above mentioned members first permit the brush to move by its own weight to engage said surface and then the plunger head move relative the cylinder to compress the coil spring in the cylinder. In the event the brush rides up on an obstruction, the coil spring permits the cylinder to move relative to the plunger and thus the brush to swing upwardly until it has passed over the obstruction.

In moving lever 210 to the dotted line position, first the plunger head is moved to abut against the cylinder end wall and then it raises the cylinder through the previously described connections, the pivot shaft 93 swingingly raising brush 100 off the floor. The other leg of the notched bracket holds the control lever in the dotted line position and accordingly the brush above the floor.

The brush 100 is arranged to be driven by a hydraulic motor 101, see FIGURE 3, which is served by two hydraulic connections 102 and 104. These hydraulic connections, one an inlet and the other an outlet, of the hydraulic motor 101, extends through the framing and bodywork of the scrubbing unit, and terminate as detachable hydraulic connectors 102A and 104A. These hydraulic connections are adapted to be connected to the hydraulic connections 102B and 104B on the propulsion vehicle. It may be stated parenthetically that, according to the copending applications aforesaid, hydraulic pump means are driven by the power source of the vehicle and are provided for operating the curb sweeping brush, for propelling the vehicle, for operating the hydraulic mechanisms for raising and lowering the lift support arms, and for other purposes. When it is desired to provide a hydraulic supply for another unit, such as here exemplified by the scrubbing unit, it is only necessary to connect into one of the available hydraulic sources, such as the pressure source for operating the curb sweeping brush. In the present instance, such curb sweeping brush is, as will be described, replaced by a curb-scrubbing brush, and is rotated by its own hydraulic motor 110 served by the lines 107 and 109. The hydraulic lines 102 and 104 are simply connected in series, as is illustrated in FIGURE 3. The hydraulic supply, indicated by arrow 108 in FIGURE 3, for line 106 thus passes in series through the connectors 104B–104A, then via line 104 to the motor 101, and thence via the return line 102 and connectors 102A–102B, to line 109 that is connected to the motor 110 which operates the curb scrubbing brush generally designated 111. The hydraulic return line 107 extends from the motor 110 back to the sump of the hydraulic system of the propulsion and support machine generally designated 10.

The hydraulic motor 101 on the arms 98R–98L are drivingly connected to the cylindrical scrubbing brush 100 and rotates it in the direction of arrow 114, which is to say rearwardly in respect to the direction of motion of the scrubbing machine when it is moving forwardly, as shown by the arrow F. Accordingly, the scrubbing liquids distributed by the header 86 and nozzles 87 is thoroughly scrubbed in a rearward direction due to the rotation of the brush 100 in the direction of arrow 114.

Even though the preceding description has set forth that the scrubbing brush 100 as being driven by a hydraulic motor, it is to be understood that a separate engine and suitable drive connection may be provided on unit 49 in place of the motor 101 to drive brush. In such an event, if the curb brush is to be driven by a hydraulic motor, then lines 106 and 109 are directly connected at connector means 102B and 104B. Also the unit 49 may be provided with its own vacuum blower that is driven by such a separate engine to apply suction to collection tank 59 through an appropriate port and port 60 eliminated.

If a separate engine is provided for unit 49, it may be mounted on the top wall of cover 54 or else one of the tanks used as a detergent tank (62R and 62L) may be of a shorter length and the engine suitably mounted in the thus provided space within the interior of the unit. In either case, the engine would have suitable controls including a driven shaft that mounts a drive sheave in position for driving a belt that in turn drives a double pulley sheave journaled for rotation adjacent pivot 93 for rotating about the same axis as arms 98R, 98L. The last mentioned pulley in turn would drive a pulley sheave that through suitable connections drives the brush 100. Of course, the separate engine could be drivingly connected to brush 100 through other conventional structure.

Referring to FIGURES 3, 4, 5 and 9, it will be noted that the right forward projecting end 10A of the propulsion vehicle is provided with a pair of ears 112 that mount a pivot 115. Pivot 115 pivotally mounts a vertically swingable arm 116 which serves as a mounting for the curb scrub brush 111. On the frame 10A, downwardly and forwardly of pivot 115, there are forwardly projecting ears 118 mounting a pivot 119 which serves as a pivot for the bell-crank member 120 that extends inwardly through a slot in 10A. The pull rod 122 is pivotally attached at 121 to the inner end of member 120 and extends up to the arm 123 on the control rock shaft 124. The control lever 28 which extends through L-notch 128 in the frame (FIGURE 5) is also connected to shaft 124. When the control lever is pulled rearwardly in the direction of arrow 126, bell-crank member 120 will be moved clockwise as seen in FIGURE 4. Member 120 is shaped so as to provide a notch 120A which abuts against a pin 127 mounted by a channel portion of arm 116. Accordingly, when the control 28 is moved in the direction of arrow 126, the pin 127 will be lifted by member 120 being pivoted and consequently the arm 116 will be pivotally lifted in the direction of arrow 130 (FIGURE 4) for elevating the curb scrubbing brush 111 and upon moving the lever 28 downwardly in the notch as seen in FIGURE 5, the brush 111 will be held in an elevated condition relative to the floor.

The maximum movement of arm 116 in a downward direction is limited by member 120 pivoting to a position to abut against the lower edge of the slot through which it extends.

Also, on the lower front portion of projection 10A there is a forwardly extending bracket 132 having a diagonal depending flange that mounts a pair of pivots 134. Pivots 134 mount downwardly and forwardly depending links 135 which are respectively pivotally attached at 136 to a frame 137 of a squeegee 138 (FIGURE 4). The squeegee is thus supported by a parallel linkage. The squeegee has an upwardly extending rod 139 that is attached to frame 137 and passed through an aperture in rod 139 so that when arm 116 is raised, the rod 139 will also be pulled up so as to lift the squeegee 138 off of the floor S. Normally collar 140 is positioned slightly above arm 116 (when in a down position) to permit limited floating movement of the arm 116 without raising the squeegee.

A hydraulic motor 110 is mounted at the forward end of arm 116, the motor being mounted on a bracket 142 having a vertical slot through which clamp bolt 144 is extended. Bolt 144 extends through a corresponding slot in arm 116. This permits limited vertical adjustment of the motor and the structure depending therefrom. In order to hold the motor against pivotal movement and its shaft 145 at the same angle of inclination relative surface S, the bracket is provided with a straight edge that abuts against bar 141 welded to arm 116. The abutting surface of bar 141 and bracket 142 are preferably inclined about 5° to the vertical. The motor shaft 145 of motor 110 extends down through the flexible coupling 146 that is bolted to the frame 147 of the curb scrub brush generally designated 111. The coupling 146 permits limited wobble of the frame 147 relative shaft 145 but at the same time applies greater pressure to the forward angular portion of the brush.

The curb scrub brush frame has a circular flange 148 concentric with the frame 147 and the axis of rotation of the coupling 146, said flange extending above and around the plurality of apertures 149 provided in the frame. A bracket 150 extends downwardly from the frame belt 51 and supports the lower end of the flexible hose 84 through which scrubbing liquid is delivered to be above the holes 149 and at an elevation to permit the brush 111 being lifted to its control 28 raised position. The scrubbing liquid falls within the ring formed by the flange 148 and in passing through the holes 149 falls into the hollow center portion of the brush 111 to be utilized in the scrubbing operation.

A bracket 152 is secured to arm 116 for mounting a brush guard 153 as shown in FIGURES 1, 5 and 8, guard 153 being above and partially surrounding the periphery of the brush bristle of brush 111.

The rear of the support and propulsions machine generaly designated 10, for the scrubbing operation, is provided with a squeegee assembly generally designated 160 which is detachably secured to the mobile propulsion vehicle 10 whenever it is used for scrubbing operations. This squeegee assembly is best illustrated in FIGURES 10–12. The squeegee assembly consists of a frame 161 that is in plan view of generally V-configuration, frame 161 mounting a downwardly extending squeegee of rubber or the like material at 162. This frame and squeegee material extend from 162A diagonally rearwardly through the portion 162B, thence transversely across the back 162C, and thence diagonally forwardly along the other side 162D and forwardly at 162E. Since the vehicle moves in the direction F, liquid which is not picked up by the sweeping brush 27 is squeegeed and flows down the sides of the V-shaped squeegee rubber to be in front of portion 162C. In front of portion 162C and adjacent portions 162B, 162D, there is a secondary squeegee rubber at 164, as shown in FIGURE 12. This secondary squeegee rubber has a lower vertically slotted edge portion, the lower edge in a scrubbing operation being only slightly elevated above the floor. Accordingly, there is left a space 165 between squeegees 162, 164 in which the water which is collected by the squeegee 162 accumulates. Into this space there leads the tube 166 that extends closely adjacent the floor and is connected by a flexible hose 167 that extends up through the framework of the machine 10 and finally fluidly connects to the upper rear wall of the liquid reservoir 55. Since the vacuum is induced in the chamber 55, air will flow through the hose 167 and tube 166, carrying with it the water particles that are accumulated in the space between the squeegee rubbers 162, which is on the floor, and 164 which is slightly elevated from the floor. The flow of air will facilitate the movement of the water up into the tube 167, and its final delivery into the tank 55. It will be understood that there is a generous flow of air through the tubes 166, 167 along with the droplets of water. The entire frame 161 of the squeegee 160 is supported as follows:

From each side of the vehicle 10 there are downwardly extending support brackets 169, each having a horizontal transverse portion 169B and a lug 169A which mounts the pivot 170. The pivot is connected by a link 171 to a pivot 172 which is connected to an upstanding bracket 174 on the frame 161 respectively, adjacent the juncture of 162E and 162D, and 162A and 162B. An adjusting screw 175 on the bracket portion 169B provides a "bottom" adjustment for the movement of the link 171, and hence vertical adjustment for the front portions of the squeegee 162.

The rear central portion of frame 161 is supported at 162C by a suspension rod 176 terminating at pivot 177 that is mounted in said position. This rod extends upwardly to bell-crank 178 and is pivotally connected thereto at 179. The bell-crank 178 is pivotally connected at 183 to a bracket 173 mounted on the vehicle frame. Link 180 has one end pivotally connected to crank 178 and the opposite end pivotally connected to arm 181 which in turn is welded to rock shaft 182. Adjacent controls 25 there is provided a hand lever 184 for selectively rotating the rock shaft. A coil spring 168 at one end is connected to bracket 173 and at the opposite end to pivot 179 to in conjunction with the relative positions of the above mentioned pivotal connections to the bell-crank resiliently retain the squeegee assembly in engagement with the floor when lever 184 is in the solid line position of FIGURE 12 and to provide an overcenter lock (cross axis of pivot 182) to hold said assembly above the floor when lever 184 is in the dotted line position. A stop 185 is fastened to the vehicle frame to extend to a position to be engaged by the rearwardly extending lug 186 on frame 161 when the hand lever is moved from said solid line position to said dotted line position. The action is as follows:

When the lever 184 is pushed rearwardly to the dotted line position shown in FIGURE 12, this has the effect of pivoting the crank 178 to the dotted line position and lifts the rod 176 until the piece 186 hits the bottom of the stop 185. Further upward movement of the rod 176 will result in the front portions of the frame 161 moving upwardly about a pivot axis at stop 185, this being allowed by the links 171 which are comparatively loosely fitted. However, links 171 prevent any substantial transverse movement of the squeegee assembly. The above serves to pull the whole squeegee off the floor with one operation.

In place of the rear squeegee assembly 160 there may be provided a rear water collection and pickup assembly 250, see FIGURES 13 and 14. The assembly 250 comprises the members for mounting the rear squeegee frame for movement, including pivot member 177, lug 186 and brackets 174 which are welded to the generally V-shaped plenum chamber member 251 and stop 185. Member 251 in plan configuration is generally the same shape as assembly 160 and encloses a hollow chamber 252. This member is provided with a downwardly directed outlet nozzle 253 that has a slotted outlet for directing an air blast against the floor as indicated by the arrows in FIGURE 13 and an inlet that opens to chamber 252. An inlet tube 254 is connected to the apex portion of member 251 to open to chamber 252 and at the opposite end is connected to line 257 to be placed in fluid communication with a valve 256 on tube 255 that opens to the outlet 42 of the suction blower. If desired this outlet may be at least partially capped to provide air under sufficient pressure. Valve 256 is provided for regulating the volume of air to chamber 252.

Forwardly of, but adjacent to the apex portion of member 251 is a take-up tube 258 that is supported to have the lower edge thereof closely adjacent the floor, the other end of tube 258 being connected via line 167 to tank 55. Advantageously tube 258 may be mounted by a bracket 259 that is welded to member 251.

In using assembly 250, the valve 256 is opened to supply air under pressure to chamber 252, the pressurized air existing from nozzle 253 to force the residual water toward the central line of movement of the vehicle and thereby in position to be picked up through tube 258 as the vehicle moves in direction F. That is, nozzle portion 253A, 253D direct air to move the residual water transversely inwardly while nozzle portions 253B and 253C direct air to move the residual scrub water diagonally forwardly and inwardly as indicated by the arrows in FIGURE 13 so as to be in line with the forward movement of tube 253 to be picked up as the vehicle 10 moves forwardly.

The plan of the scrubbing machine, in its operating condition, is shown in FIGURE 10. The machine moves in a forward direction F. A header 86 which has apertures 87 in its lower portion, distributes liquid downwardly on the floor or the surface being scrubbed. Liquid is also delivered to the central portion of the curb brush 111. The curb brush is slightly forward of all other brushes on the machine, and it rotates in the direction of arrow 189. Behind the curb brush there is located the squeegee 138 on frame 137. It has the effect of dragging the scrubbing liquid in the direction of arrow 190, as the machine moves forwardly, delivering the scrubbing liquid to a position 191 rearwardly of brush 100 and which will later on be swept by the rotating brush 27. The movement of the bristles of the brush 100 (rotates in the direction of arrow 114) where they contact the surface being scrubbed, is opposite to the forward direction, i.e. it is toward the rear of the machine. As the machine travels forwardly, the collection pan 91, FIGURE 7, will pass over the liquid which lies on the floor, and over any objects on the floor. If any object protrudes upwardly, the rear lip 91G of the collection pan can move upwardly a sufficient amount so as to clear a floor object. The floor which is still wet with scrubbing liquid, is then encountered by the brush 27, which revolves in the direction of arrow 40, thus sweeping the liquid in any solid debris forwardly in the direction F, and into the liquid and debris collection hopper 91. Most of the liquid used in the scrubbing operation is picked up in this way. The liquid flows forwardly in the hopper, being strained by the screen 96. The suction via pipe 97 into the space forwardly of the screen 96 pulls some air through the screen, thus facilitating the flow forwardly of the swept scrubbing liquid. The flow of the air and the liquid in the trough then join and go up through the suction tube 97, being delivered at 97S into the upper portion of the collection tank 55 where the liquid separates from the air. As the machine continues its movement forwardly, any remaining moisture on the floor is encountered by the squeegee 162 and the action of the squeegee is to cause the water to be progressed in the direction of arrows 194—194 toward the rearmost portion 162C of the V-shaped squeegee. The liquid passes under the slightly elevated edge of the front squeegee rubber 164, and into the space 165, where with air also inflowing at this point, it is collected and drawn up right through the tube 166 and the pipe 167, and thence pulled forwardly in the machine (see FIGURE 7), to be collected into the collection tank 55. In the collection tank the liquid droplets are separated from the inflowing air, and the liquid collects as the air is drawn out through the aperture 58 so long as the liquid is low enough that the valve ball 57 does not close said aperture. The air then flows through the connection chamber 59 to the port 60, and thence through port 44 to the inlet connection 43 of the vacuum blower 41, and through the blower outlet 42 to atmosphere. As liquid accumulates in the tank 55, and even where foam is present, the ball 57 will be elevated until it closes the aperture 58, thereby shutting off the collection of liquid. This is a signal to the operator that the tank 55 must be emptied.

When it is desired to take the scrubbing unit off vehicle 10, the controls of the machine 10, at 26, are operated, and the arms 39 and 40 will be moved arcuately upwardly in the direction of arrows 196, to the position shown in FIGURE 2. The legs 52 and 53 which had been in their up-folded condition, exemplified in part by FIGURE 8, are then unlatched and moved to the vertical position as shown in FIGURE 3. Now the hydraulic controls of the vehicle 10 are again actuated and the arms 39–40 lowered so as to permit the entire scrubbing unit to rest on the legs 52–33. The clips 220 on each of the arms 39 and 40 are then released, and the arms 39 and 40 sufficiently lowered so that the notches 39A and the notch on arm 40 are moved away from the pivots 221 on the scrubbing entity 49. Now the machine 10 may then be backed away from the scrubbing unit 49, as shown in FIGURE 3, it being understood that the hydraulic connections 102A–B and 104A–B are disconnected.

Also to be mentioned is that the downward pressure on the curb brush 111 can be varied up to nearly the weight of the arm 116 by loosening bolt 144 and moving bracket 142 (and motor 110) in the appropriate vertical direction. After making the adjustment, clamp bolt 144 is again tightened.

If it is desired to elevate the side or curb scrubbing brush 111 (after entity 49 has been dis-attached), it is only necessary to remove the stop collar 140, and the entire arm 116 may then be elevated to the dotted line position shown in FIGURE 4. If the machine 10 is then to be used for ordinary dry sweeping, the curb scrubbing brush 111 is removed and an ordinary curb sweeping brush is substituted. By removing the pivots 134, the entire curb squeegee 137–138 can be quickly removed.

If the brush 27 is made according to Patent 2,789,534, it may be used equally well for dry sweeping and wet scrubbing. Therefore, brush 27 need not be changed when changing from a sweeping to a scrubbing operation.

For most sweeping operations it is not undesirable to have the rear squeegee assembly 160 in place, but if it is desired to remove this, it is unbolted at pivots 174, 177 and 179 and taken off until further scrubbing operations are desired. At this time tube 167 is separated from tube 166. Ordinarily, for dry sweeping the rear squeegee is simply elevated sufficiently so that it does not rub on the surface being swept. It is not usually in the way.

In some instances where the dirty film on the surface is hard to remove, the blower 41 may be turned off through suitable controls and the assembly 160 raised. Then machine 10–49 is run over the surface to be cleaned a number of times (without scrub water pick-up) and with both brushes 27 and 100 operating to leave the scrub water on the surface to give a "soak time." Later the blower is turned on and the unit 10–49 is operated as described above to both scrub and pick-up the scrub water.

Also to be mentioned is that in the event the machine 10, 49 is being used for scrubbing rough surfaces such as rough concrete floors, and the machine has an assembly 160, the assembly 160 would not tend to pick up much water due to the undue roughness of the floor. In this case the assembly 160 would be left in a raised condition and the vacuum in line 167 discontinued, if desired, through the provision of a valve (not shown) in such line. In such an event, the scrub water would be picked up through brush 27, forcing the majority of the scrub water into collection member 91 where the scrub water is sucked up through tube 97.

In some places to be cleaned, there is only very little film to be scrubbed and in such places it is not necessary to provide units having both brushes 27 and 100. For such usage, a more economical scrubbing unit may be provided to do the job by providing a unit 49 of the construction illustrated other than no brush 100, and no drive structure, mounting members or controls for brush 100 are provided. With such a modified unit 49, the brush 27 of the vehicle 10 would provide the necessary scrubbing action. Brush 27 may be of a construction to be used for both dry sweeping and scrubbing, or if it is of a construction for just dry sweeping, it would be removed and a suitable scrubbing brush substituted therefor.

As many widely apparently different embodiments of this invention may be made without departing from the spirit and scope thereof, it is to be understood that we do not limit ourselves to the specific embodiments disclosed herein.

What we claim is:

1. A scrubbing machine comprising a mobile, wheel-supported, power driven, steerable, operator controlled vehicle having a power source thereon, front and rear wheels, scrubbing liquid tank means on the vehicle, a scrubbing liquid distributor mounted on the vehicle for distributing scrubbing liquid across the path of motion of the vehicle as the vehicle moves, a connection from said distributor to said scrubbing liquid tank means, a dirty scrubbing liquid collector tank on said vehicle, a scrubbing cylinder mounted on the vehicle for rotation about an axis transverse to the direction of motion of the vehicle, power means connecting said scrubbing cylinder to the power source on the vehicle for rotating the cylinder, a floor maintenance device mounted on the vehicle for rotation about a horizontal axis transverse to the direction of motion of the vehicle, said device being mounted on the vehicle in rearwardly spaced relation to the scrubbing cylinder with respect to the direction of motion of the vehicle, a collection trough extending transversely across the vehicle between the scrubbing cylinder and said device, said trough having an inlet in part bounded by a lower lip facing said device to receive material raised by said device, means mounting said trough on the vehicle for limited movement relative thereto as the vehicle moves to permit the lip raising relative said surface, squeegee means mounted on the vehicle to extend rearwardly of the rear wheels for collecting scrubbing liquid that is not collected on the trough and suction means extending into the trough and adjacent the squeegee means and connected to the dirty scrubbing liquid collector tank for transferring liquid from the trough and the liquid collected by said squeegee means to said collector tank.

2. A mobile powered wheel supported steerable vehicle, said vehicle including a power source connected to said wheels for propelling the vehicle and for auxiliary power source purposes, support members mounted on the vehicle for up and down movement, said support members being oriented so as to be engageable with an appropriately shaped load for lifting the load and carrying it supported by said support members in fixed orientation with reference to the vehicle and on said vehicle, a sweeping brush mounted on said vehicle for rotation about a substantially horizontal axis transversely of the normal direction of forward motion of the vehicle, means connecting the sweeping brush and said power source on the vehicle for rotating the sweeping brush, a suction blower fan mounted on the vehicle and drivably connected to said power source thereby providing a source of suction on said vehicle, a scrubbing unit attachment shaped so as to be engageable by said support members for lifting of the scrubbing unit into position for carrying the scrubbing unit on the propelling vehicle, said scrubbing units including a fresh scrubbing water supply tank, a dirty scrubbing water collection tank, a distributor for fresh scrubbing water mounted on the scrubbing unit and connected through conduit means to the fresh scrubbing water supply tank for distributing scrubbing water therefrom onto the surface over which the scrubbing unit is carried by the propelling vehicle, collector means on the scrubbing unit for collecting swept debris and swept water, a fluid carrying conduit between the collector means and the dirty scrubbing water collection tank, said dirty scrubbing water collection tank being provided with a port that is in communication with the suction blower on the vehicle when the scrubbing unit is supported by the support members and carried by the vehicle thereby inducing a partial vacuum in the scrubbing water collection tank, to induce a flow of air and collected dirty scrubbing water through said conduit from said collector means to the dirty scrubbing water collection tank.

3. The scrubbing machine specified in claim 2 further characterized in that the collector means on the scrubbing unit is comprised of a collector trough.

4. The scrubbing machine specified in claim 3 further characterized in that scrubbing water collection means is provided on the vehicle at a rear portion thereof for collecting the scrubbing water which is not swept up by said sweeping brush, and suction means is provided between said scrubbing water collection means and said scrubbing water collection tank for transferring scrubbing water collected by said scrubbing water collecting means to said scrubbing water collection water tank.

5. The scrubbing machine specified in claim 4 further characterized in that said scrubbing water collection means comprises a squeege of generally V-shape configuration mounted on the propelling vehicle with the point of the V at the approximate center line of the vehicle and directed oppositely to the normal direction of forward motion of the vehicle, and operator control means is connected to said squeegee means and to a controller located adjacent the operator for lifting and lowering said squeegee means.

6. The scrubbing machine specified in claim 4 further characterized in that said scrubbing water collection means comprises a squeegee in the general shape of a V mounted with the point of the V on the approximate center line of the vehicle, and directed rearwardly in respect to the normal direction of forward motion of the vehicle, said squeegee comprising a flexible lip adapted to contact the surface over which the vehicle travels, and a secondary lip mounted forwardly of said flexible lip, and slightly elevated above said surface, said suction means being connected to the space between the said lips.

7. The scrubbing machine specified in claim 2 further characterized in that a cylindrical scrub brush is provided on the scrubbing unit, said scrub brush mounted for rotation about a substantially horizontal axis transverse to the direction of motion of the propelling vehicle, said scrubbing brush being mounted between the scrubbing water distributor and said collector trough, means, and power means connected to the scrubbing brush to rotate the same.

8. The scrubbing machine specified in claim 7 further characterized in that a power transmission connection is provided between the scrubbing brush on the scrubbing unit and the power source on the propelling vehicle for rotating the scrubbing brush therefrom.

9. The scrubbing machine specified in claim 7 further characterized in that a separate power means is provided on the scrubbing unit and connected to the scrubbing brush for rotating the scrubbing brush.

10. The scrubbing machine specified in claim 2 further characterized in that a disc shaped curb scrubbing brush is mounted on the vehicle for rotation about a substantially upright axis and power means is connected thereto and to the power source on the vehicle for rotating said curb scrubbing brush, and a liquid supply line extending from said scrubbing liquid supply tank and terminating in a position to deliver scrubbing liquid to said curb scrubbing brush.

11. The scrubbing machine specified in claim 10 further characterized in that squeegee means is provided on the propelling vehicle, said squeegee means being mounted for limited vertical movement, and in a position extending transversely and rearwardly across the path of motion of the curb scrubbing brush, the rearward portion of said squeegee being within the path of motion of said sweeping brush on said vehicle.

12. The scrubbing machine specified in claim 10 further characterized in that operator controlled means is provided on the propelling vehicle and connected to the curb scrubbing brush for elevating the curb scrubbing brush to a position out of contact with the surface over which the vehicle is moving.

13. The scrubbing machine specified in claim 10 further characterized in that said scrubbing brush is mounted so as to be manually swingable upwardly to a position in which it is folded back against a supporting surface on the propelling vehicle.

14. A mobile powered wheel supported steerable vehicle, said vehicle including a power source connected to said wheels for propelling the vehicle and for auxiliary power source purposes, support members mounted on the vehicle for up and down movement, said support members being oriented so as to be engageable with an appropriately shaped load for lifting the load and carrying it supported by said support members in fixed orientation with reference to the vehicle and on said vehicle, a sweeping brush mounted on said vehicle for rotation about a substantially horizontal axis transversely of the normal direction of forward motion of the vehicle, means connecting the sweeping brush and said power source on the vehicle for rotating the sweeping brush, a suction blower fan mounted on the vehicle and drivably connected to said power source thereby providing a source of suction on said vehicle, a scrubbing unit attachment shaped so as to be engageable by said support members for lifting of the scrubbing unit into position for carrying the scrubbing unit on the propelling vehicle, said scrubbing unit including a cleaning liquid supply tank, a recovery liquid collection tank, a distributor for cleaning liquid mounted on the scrubbing unit and connected through conduit means to the cleaning liquid supply tank for distributing cleaning liquid therefrom onto the surface over which the scrubbing unit is carried by the propelling vehicle, collector means on the scrubbing unit for collecting swept debris and swept water from the sweeping brush, a fluid carrying conduit between the collector means and the recovery liquid collection tank, said recovery liquid collection tank being provided with a part that is in communication with the suction blower on the vehicle when the crubbing unit is supported by the support members and carried by the vehicle thereby inducing a partial vacuum in the recovery liquid collection tank, to induce a flow of air and collected dirty scrubbing water through said conduit from said collector means to the recovery liquid collection tank, a scrub brush on said scrubbing unit located forwardly of the swept debris collection means and sweeping brush to scrubbingly engage the surface having distributed cleaning liquid thereon, and hydraulic motor means for driving said scrub brush.

15. A scrubbing machine comprising a mobile vehicle, power means on said vehicle, a cleaning liquid tank on said vehicle, a recovery tank on said vehicle, means connected to the clean liquid tank for distributing clean liquid therefrom onto the surface on which the vehicle moves, a generally cylindrical floor maintenance device mounted on the vehicle for rotation about a horizontal axis transverse to the normal direction of motion of the vehicle, a collection trough extending transversely across the vehicle and close to said device to receive material raised by said device, said trough having a top wall, side walls, a bottom wall inclined downwardly in a direction away from said device, an end wall inclined upwardly in the last mentioned direction joined to the edge of the bottom wall opposite said device, and a lip joined to the edge of the bottom wall that is adjacent said device, said lip being inclined downwardly in a direction toward said device, said lip, side walls and top wall having edges adjacent said device forming an inlet facing said device, said top wall at least in part overhanging said lip and being at substantially higher elevation than said lip and bottom wall, means mounting said trough on the vehicle for limited pivotal movement about a transverse horizontal axis relative the vehicle, and suction means connected to the dirty scrubbing liquid collector tank for transferring liquid from the trough to said collector tank, and means connecting said device to the power source for rotating the device in the direction to direct swept material toward said trough inlet.

16. A sweeping machine including a wheel supported sweeper frame, said sweeper frame having a rotary floor maintenance implement enclosure that is open at the bottom and has an unobstructed ejection opening, a rotary floor maintenance implement mounted in said enclosure, a scrubbing attachment, means on the sweeper frame for lifting and detachably carrying said attachment adjacent said unobstructed opening, said attachment including an attachment frame, a dirty water collection tank mounted on said attachment frame, means connected to the attachment frame and extending adjacent to said unobstructed opening for collecting liquid from the surface scrubbed by said implement, suction applying means fluidly connected to the collection tank for applying a suction thereto, conduit means connected to the collection tank and extending adjacent to the collection means for withdrawing liquid from the collection means and returning it to the collection tank, and power means on the sweeper frame drivingly connected to said implement for rotating it.

17. A sweeping machine including a wheel supported sweeper frame, said sweeper frame having a rotary floor maintenance implement enclosure that is open at the bottom and has an unobstructed ejection opening, a rotary floor maintenance implement mounted in said enclosure, a scrubbing attachment, means on the sweeper frame for lifting and detachably carrying said attachment adjacent said unobstructed opening, said attachment including an attachment frame, a plurality of legs, means mounting said legs on the attachment frame for movement between a folded up position and a position for supporting said attachment in an elevated condition when the attachment is disattached from said lifting and carrying means, a dirty water collection tank mounted on said attachment frame, means connected to the attachment frame and extending adjacent to said unobstructed opening for collecting liquid from the surface scrubbed by said implement, suction applying means fluidly connected to the suction tank for applying a suction thereto and conduit means fluidly connected to the collection tank and extending adjacent the collection means for withdrawing liquid from the collection means and returning it to the collection tank, and power means on the sweeper frame drivingly connected to said implement for rotating it.

18. A sweeping machine including a wheel supported sweeper frame, said sweeper frame having a rotary floor maintenance implement enclosure that is open at the bottom and an unobstructed ejection opening, and transversely spaced frame portions located on either transverse side of said unobstructed opening, and a rotary floor maintenance implement mounted in said enclosure, a scrubbing attachment, means on the sweeper frame for detachably carrying said attachment adjacent and at least in part between said frame portions and the unobstructed opening, said attachment including an attachment frame, dirty water collection tank mounted on said attachment frame, and means connected to the attachment frame and extending adjacent to said unobstructed opening for collecting liquid from the surface scrubbed by said implement, suction applying means fluidly connected to the collection tank for applying a suction thereto, conduct means fluidly connected to the collection tank and extending adjacent the collection means for withdrawing the liquid from the collection means and returning it to the collection tank, and power means on the sweeper frame drivingly connected to said implement for rotating it in a direction to direct the liquid on said surface toward the collection means.

19. A sweeping machine including a wheel supported sweeper frame, said sweeper frame having a rotary floor maintenance implement enclosure that is open at the bottom and has an unobstructed ejection opening that opens forwardly in the direction of normal movement of said sweeper frame, and transversely spaced frame portions located on either transverse side of said unobstructed opening and extending forwardly of said unobstructed opening, and a rotary floor maintenance implement mounted in said enclosure, a scrubbing attachment, means on the sweeper frame for detachably carrying said attachment adjacent said frame portions and the unobstructed opening, said attachment including an attachment frame, a dirty water collection tank mounted on said attachment frame, and means connected to the attachment frame and extending adjacent to said unobstructed opening for collecting water from the surface scrubbed by said implement, suction applying means connected to the collection tank and extending adjacent the collection means for withdrawing liquid from the collection means and returning it to the collection tank, a squeegee attachment mounted on the rear portion of the sweeper frame for collecting liquid not picked up by said collection means, said suction applying means including a liquid pick up conduit for picking up liquid collected by said squeegee attachment and conducting it to the collection tank, and power means on the sweeper frame drivingly connected to said implement for rotating it in a direction to direct the liquid on said surface toward the collection means.

20. A sweeping machine including a wheel supported sweeper frame, said sweeper frame having a rotary floor maintenance implement enclosure that is open at the bottom and an unobstructed ejection opening, and transversely spaced frame portions located on either transverse side of said unobstructed opening, and a rotary floor maintenance implement mounted in said enclosure, a scrubbing attachment, means on the sweeper frame for detachably carrying said attachment adjacent said frame portions and the unobstructed opening, said attachment including an attachment frame, a dirty water collection tank mounted on said attachment frame, and means connected to the attachment frame and extending adjacent to said unobstructed opening for collecting liquid from the surface scrubbed by said implement, suction applying means connected to the collection tank for withdrawing liquid from the collection means and returning it to the collection tank, said suction applying means including a suction blower fan mounted on the sweeper frame to provide a source of suction, means for fluidly connecting said fan to the top portion of said collection tank to apply a suction thereto, and conduit means opening to the top portion of the collection tank in spaced relation to the point of application of suction to said collection tank and extending adjacent the collection means for through suction withdrawing liquid from the collection means and conducting it to the collection tank, and power means on the sweeper frame drivingly connected to said implement for rotating it in a direction to direct the liquid on said surface toward the collection means.

21. The structure of claim 20 characterized in that said fluidly connecting means includes means forming a plenum chamber on the attachment frame that opens to the top portion of said collection tank and has a suction port, and means on the sweeper frame for placing said suction port in fluid communication with the suction blower fan.

22. A scrubbing machine having a normal forward direction of motion comprising a mobile vehicle, power means on said vehicle, a clean water tank on said vehicle, a dirty water tank on said vehicle, a cylindrical scrub brush mounted for rotation about an axis transverse of the vehicle, and mounted so that the cylindrical brush scrubs the surface over which the vehicle moves after said surface has been wetted by clean water, a curb scrubbing brush, elongated frame means for mounting the curb scrubbing brush for rotation about a substantially upright axis at a forward side corner of the vehicle, said elongated frame means having one end portion for mounting the curb brush in the aforementioned manner and an opposite end portion, means for mountingly connecting the opposite end portion of said frame means to the vehicle frame for movement between a poistion in which the curb scrubbing brush engages the surface to be cleaned and a position that the curb scrubbing brush is out of engagement with said surface, means connected to the clean water tank for distributing scrubbing liquid in the path of movement of said scrub brushes, and means on the vehicle for collecting the liquid from the surface scrubbed by said curb brush and cylindrical brush, the last mentioned means including a squeegee and means for attaching said squeegee to said frame and to said frame means, said attaching means including means for mounting said squeegee to extend at an angle inclined inwardly in a rearward direction to direct the liquid contacted by the curb brush onto the surface scrubbed by said cylindrical brush and to mount said squeegee for limited free movement relative said frame means.

23. A sweeping machine including a wheel supported sweeper frame, a scrubbing attachment, means for detachably mounting said attachment on said sweeper frame, said attachment including an attachment frame, a scrubbing implement rotatably mounted on said attachment frame, a cleaning liquid tank mounted on said attachment frame, a liquid distributor connected to said cleaning liquid tank, means fluidly connected to said liquid distributor for distributing cleaning liquid onto the surface to be scrubbed by said implement, a dirty water collection tank mounted on said attachment frame, means connected to one of said frames for collecting liquid from the surface that has been scrubbed by said implement, suction applying means fluidly connected to the collection tank for applying a suction thereto, and conduit means fluidly connected to the collection tank and extending adjacent the collection means for withdrawing the liquid from the collection means and returning it to the collection tank, power means on the sweeper frame drivingly connected to said implement for rotating it, a disc shaped curb scrubbing brush, means attached to the sweeper frame for mounting said curb brush for rotation about a vertical axis adjacent one front corner portion of the scrubbing attachment including separate power means for driving said curb brush that is drivingly connected to the first mentioned power means, means connected to said liquid distributor for directing liquid to said curb brush for wetting the floor surface adjacent the curb brush and squeegee means mounted on said curb brush mounting means for directing the liquid contacted by the curb brush into the path of movement of the collection means.

24. A sweeping machine including a wheel supported frame, a rotary floor maintenance device mounted on said sweeper frame, a scrubbing attachment, means for detachably mounting said attachment on the sweeper frame, said attachment including an attachment frame, a scrubbing implement rotatably mounted on said attachment frame, a cleaning liquid tank mounted on said attachment frame, header means fluidly connected to said cleaning liquid tank for distributing cleaning liquid onto the surface to be scrubbed by said implement, a dirty water collection tank mounted on said attachment frame, means mounted on the attachment frame to extend adjacent said device when the attachment is mounted on the sweeper frame for collecting liquid from the surface that has been scrubbed by said implement, said collection means having an inlet facing said device and adjacent thereto to receive material from said rotary device, suction applying means fluidly connected to the collection tank for applying a vacuum thereto, conduit means fluidly connected to the collection tank and extending adjacent the collection means for, through the vacuum applied to the collection tank, withdrawing the liquid from the collection means and returning it to the collection tank, and power means connected to said implement and to the rotary device for rotating them, said power means including means for drivingly rotating said device in a direction to direct liquid on said surface toward said collection means.

25. A sweeping machine having a normal forward direction of motion including a wheel supported sweeper frame having a forward end portion and a rearward end portion, and a rotary floor maintenance implement mounted on said sweeper frame, a scrubbing attachment, means for detachably mounting said attachment on the forward end portion of said sweeper frame to be carried by said sweeper frame, said attachment including an attachment frame, a cleaning liquid tank mounted on said attachment frame, header means fluidly connected to said cleaning liquid tank for distributing cleaning liquid onto the surface to be scrubbed by said implement, a dirty water collection tank mounted on said attachment frame, and means connected to the attachment frame forwardly of said implement for collecting liquid from the surface scrubbed by said implement, suction applying means connected to the collection tank for applying a suction thereto, means connected in fluid communication with the collection tank for applying the suction in the collection tank to the collection means to withdraw the liquid from the collection means and return it to the collection tank, and power means on the sweeper frame drivingly connected to said implement for rotating it in a direction to direct the scrubbing liquid forwardly toward said collection means.

26. The structure of claim 25 further characterized in that the means for detachably carrying said attachment includes power operated support members mounted on the sweeper frame for up and down movement, said support members being oriented for engagement with said attachment for lifting it and carrying it in fixed orientation with reference to the sweeper frame.

27. A scrubbing machine comprising a mobile vehicle having a normal forward direction of motion, power means on said vehicle, a cleaning liquid tank on said vehicle, a dirty liquid tank on said vehicle, means connected to the cleaning liquid tank for distributing cleaning liquid therefrom onto the surface on which the vehicle moves and in the path of movement of said vehicle, a cylindrical scrub brush mounted for rotation about an axis transverse of the vehicle, and mounted so that the cylindrical scrub brush scrubs the surface over which the vehicle moves after said surface has been wetted by cleaning liquid, and means on the vehicle rearwardly of said cylindrical brush including suction means, for collecting the liquid from the surface scrubbed by said cylindrical brush and returning it to said dirty liquid tank, said collection means including generally horizontally elongated nozzle means extending transversely across the path scrubbed by said brush for directing jets of air forwardly and inwardly to force the scrubbing liquid toward a central collection location as the vehicle moves in a forward direction, said nozzle means including horizontally elongated diagonally forwardly diverging nozzle portions having outlets to direct air inwardly and forwardly, the aforementioned nozzle portions having adjacent ends joined to one another and opposite ends terminating vertically adjacent the respective side of the vehicle, and a horizontally elongated, forwardly extending nozzle portion vertically adjacent each side of the vehicle for directing jets of air inwardly, each of the last mentioned portion having one end joined to said opposite end of the respective first mentioned nozzle portion, means on the vehicle for supplying air under pressure to said nozzle means, and suction means extending adjacent said surface and forwardly adjacent the juncture of said diverging nozzle portions for picking up the scrubbing liquid and returning it to the dirty liquid tank.

28. A scrubbing machine comprising a mobile vehicle, power means on said vehicle, a clean liquid tank on said vehicle, a dirty liquid tank on said vehicle, means connected to the clean liquid tank for distributing clean liquid therefrom onto the surface on which the vehicle moves and in the path of movement of said vehicle, a scrub brush mounted for rotation on the vehicle to scrub the surface over which the vehicle moves after said surface has been wetted, and means on the vehicle rearwardly of said brush, including suction means, for collecting the liquid from the surface scrubbed by said brush and returning it to said dirty liquid tank, said collecting means including a generally V-shaped assembly for forcing the scrubbing liquid toward a central collection position as the vehicle moves forwardly, means for picking up the scrubbing liquid at said central location and returning it to the dirty water tank, and means on the frame and connected to said V-shaped assembly for selectively moving it between a lowered working position and a raised transport position, the last mentioned means including a downwardly extending stop on said vehicle, a projection on the apex portion of said assembly to abut against said stop as the assembly is being raised, parallel linkage means movably connecting transverse end portions of said assembly to said vehicle, and control means on the vehicle connected to said assembly for when the assembly is in a lowered working position, first raising the apex portion more rapidly than said end portion to first bring said projection into abutting relationship with said stop and thence raising said transverse end portions to the transport position.

References Cited by the Examiner

UNITED STATES PATENTS

| | | | |
|---|---|---|---|
| 1,204,478 | 11/16 | Noakes et al. | 15—320 |
| 1,661,979 | 3/28 | Ugolini | 15—50 |
| 1,752,882 | 4/30 | Boutwell | 15—320 |
| 1,849,663 | 3/32 | Finnell | 15—320 X |
| 1,878,508 | 9/32 | Menkhaus | 15—50 |
| 1,923,689 | 8/33 | Rosenberg | 15—320 |
| 1,969,674 | 8/34 | Anderson-Sneadberg | 15—320 |
| 2,300,280 | 10/42 | Teager. | |
| 2,317,843 | 4/43 | Backlund | 15—50 |
| 2,709,269 | 5/55 | Williams | 15—50 |
| 2,969,557 | 1/61 | Petersen | 15—50 |
| 2,972,159 | 2/61 | Swanson et al. | 15—340 |
| 3,105,991 | 10/63 | Oberg | 15—320 |
| 3,113,332 | 12/63 | Kasper | 15—83 X |

FOREIGN PATENTS

| | | |
|---|---|---|
| 175,680 | 8/53 | Austria. |
| 660,288 | 11/51 | Great Britain. |

ROBERT W. MICHELL, *Primary Examiner.*

WALTER A. SCHEEL, *Examiner.*

UNITED STATES PATENT OFFICE
CERTIFICATE OF CORRECTION

Patent No. 3,197,798                                                                        August 3, 1965

Neil F. Brown et al.

It is hereby certified that error appears in the above numbered patent requiring correction and that the said Letters Patent should read as corrected below.

Column 4, line 58, for "or" read -- form --; column 7, line 12, for "at", first occurrence, read -- as --; line 17, for "rose" read -- hose --; line 19, for "56L" read -- 65L --; line 49, for "of" read -- or --; column 10, line 71, after "in" insert -- the arm 116. A collar at 140 is adjustably secured to the --; column 16, line 24, for "squeege" read -- squeegee --; column 17, line 46, for "crubbing" read -- scrubbing --; column 19, lines 69 and 70, strike out "having a normal forward direction of motion" and insert the same after "vehicle" in line 70, same column 19; column 22, line 32, for "about" read -- abut --.

Signed and sealed this 5th day of April 1966.

(SEAL)
Attest:

ERNEST W. SWIDER                                         EDWARD J. BRENNER
Attesting Officer                                      Commissioner of Patents